Patented Oct. 2, 1945

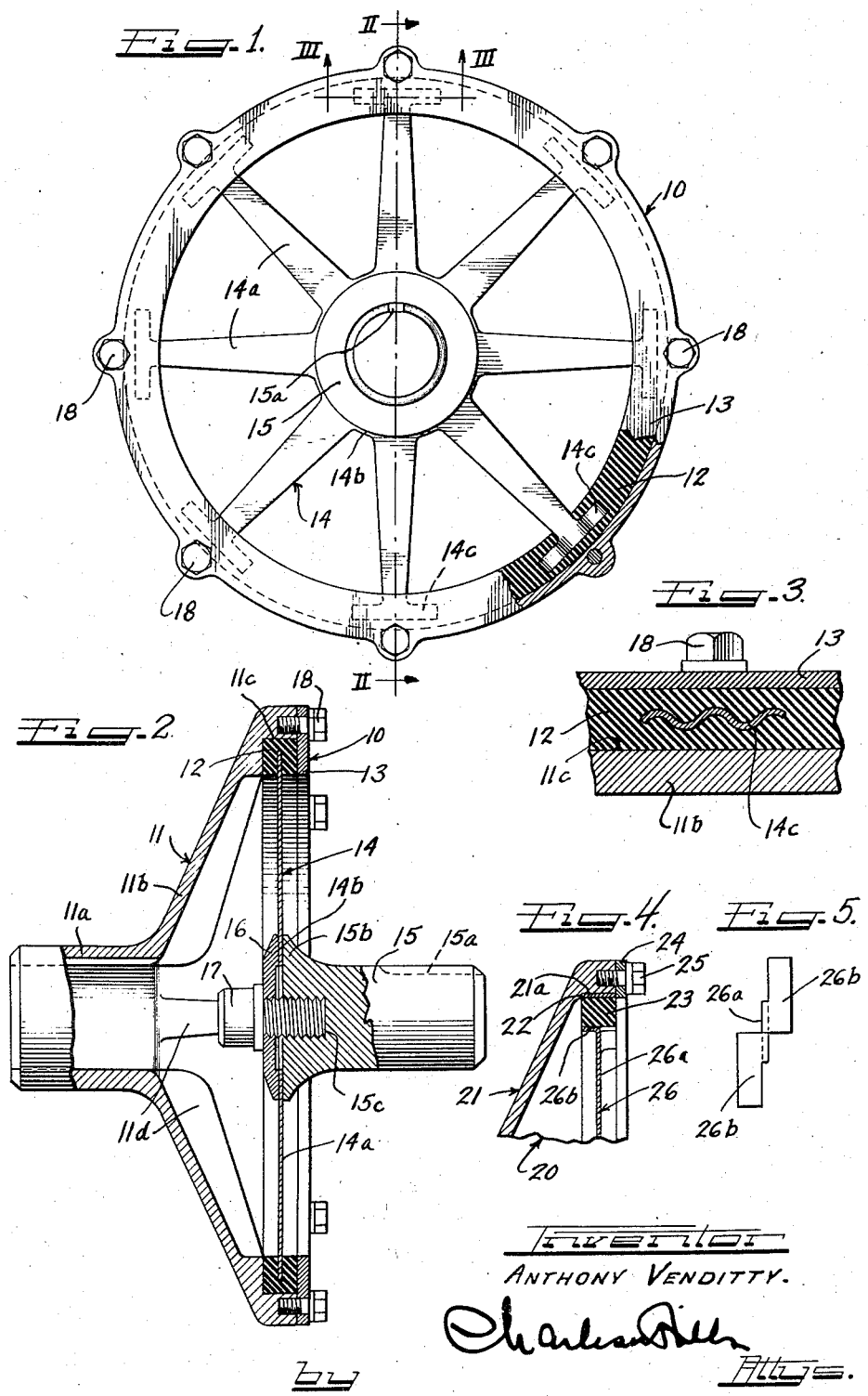

2,386,017

UNITED STATES PATENT OFFICE 2,386,017

UNIVERSAL JOINT

Anthony Venditty, Detroit, Mich., assignor to Thompson Products Inc., Cleveland, Ohio, a corporation of Ohio Application April 24, 1942, Serial No. 440,286

5 Claims. (Cl. 64—11)

This invention relates to a universal joint assembly wherein the torque load is transmitted through a spring-like member which is capable of bending to permit angulation of the joint.

More specifically the invention relates to a universal joint assembly wherein a multi-spoked spring plate or wheel carries the torque load across the widths of the spokes and wherein angulation is obtained by bending the spokes.

According to this invention a multi-spoked spring plate has its hub portion connected to one driving member and has the outer ends of the spokes resiliently mounted in the other driving member. The spokes can be quite thin but have appreciable width to carry torque loads between the driving and driven members. Due to the thinness of the spokes, however, the same can be twisted or flexed to permit angulation of the joint. The resilient mounting for the outer ends of the spokes permits foreshortening of the same due to angulation. The outer ends of the spokes are preferably bonded to a rubber ring fixedly carried by the outer joint parts. In one illustrated embodiment of the invention the outer ends of the spokes have feet or fingers seated in the rubber ring while in another illustrated embodiment of the invention the outer ends of the spokes are bent to form flanges which are bonded to the inner periphery of the rubber ring.

It is, then, an object of this invention to provide a universal joint having a spoked torque-transmitting member which is capable of being flexed to permit angulation of the joint.

A still further object of the invention is to provide a spoked spring type universal joint.

A still further object of the invention is to provide a universal joint wherein the usual yoked driving and driven members are eliminated.

A still further object of the invention is to provide a resilient universal joint having a deflectable spring plate for transmitting torque between driving and driven members over a wide range of angulation.

A specific object of the invention is to provide a universal joint with one body member carrying a rubber mounting for a spring plate and a second body member for attachment to the central portion or hub of the spring plate.

Other and further objects of the invention will be apparent to those skilled in the art from the following detailed description of the annexed sheet of drawings, which, by way of preferred examples, illustrate two embodiments of the invention.

On the drawing:

Figure 1 is a plan view, with parts broken away to illustrate underlying parts, of a universal joint according to this invention.

Figure 2 is a cross-sectional view, with parts in elevation, taken along the line II—II of Figure 1.

Figure 3 is an enlarged fragmentary cross-sectional view taken along the line III—III of Figure 1.

Figure 4 is a fragmentary cross-sectional view similar to Figure 2 illustrating a modified manner of attaching the spring spokes to the rubber ring.

Figure 5 is a plan view of the outer end of the spoke shown in Figure 4.

As shown on the drawing:

As shown in Figures 1 and 2 the reference numeral 10 designates a universal joint composed of a body member 11, a rubber ring 12 seated in the body member 11, a ring plate 13 for holding the rubber ring in the body member, a spoked spring plate 14 having the outer ends of the spokes embedded in the rubber ring 12, a second body member 15, and a cap and bolt assembly 16 and 17 for holding the second body member 15 to the hub portion of the spoked plate 14.

As best shown in Figure 2 the body member 11 has a cylindrical hub portion 11a which can be internally splined to receive a shaft in driving connection therewith. A circular flange 11b flares outwardly from the inner end of the hub portion 11a to define an annular housing or seat 11c for the rubber ring 12. The flange 11 can have integral ribs 11d thereon for reinforcing the same.

The plate 13 closes an open face of the seat 11c to hold the rubber ring in the seat. The plate 13 can be bolted to the body member 11 at spaced intervals around the ring by means of bolts or screws 18. The screws are preferably positioned adjacent the spokes of the spring plate 14, as shown in Figure 1.

The plate 14 has a plurality, preferably eight, spokes 14a projecting radially from a central apertured hub portion 14b. The opposite faces of the hub portion 14b can be splined or radially serrated if desired. Each spoke 14a has a transverse corrugated foot or cross piece 14c at the outer end thereof integral with the spoke. As shown in Figures 1 and 3, these cross feet 14c are corrugated to have laterally extending portions on the opposite faces of the feet. The corrugated feet are completely embedded in the rubber ring 12. The corrugations will serve to firmly anchor the feet 14c against rotation relative to the rubber ring. If desired, the rubber can be vulcanized to the feet 14c, or the feet can merely be forced into slots cut into the rubber ring.

The second body member 15 can have a keyway 15a for attachment to a driving or driven member. This member 15 has an enlarged end portion 15b adapted to seat on the splined hub portion 14b of the spring plate 14. The seating face of the end portion 15b may be splined or serrated to seat or bite against the hub. A threaded well 15c is formed in this enlarged end of the member 15.

The cap 16 is fitted against the opposite face of the hub 14b and may also have a splined seating face. The bolt or cap screw 17 is threaded through the cap 16 into the well 15c for clamping the hub 14b between the body member and the cap 16 to lock the body member 15 against rotation relative to the spring plate 14.

It will be noted from Figures 1 and 2 that the spokes 14a have appreciable width but that the same are quite thin. The spokes are thus adapted to carry heavy loads between the members 11 and 15 since these loads are carried across the widths of the spokes. Since the spokes are quite thin, however, the same are adapted to be flexed so that the body members 11 and 15 can be angularly disposed. The rubber ring 12 provides a cushion seat for the outer ends of the spokes and is adapted to be deflected so as to permit foreshortening of the spokes during angulation. The corrugated feet on the spokes, however, will prevent relative rotation between the rubber ring and the spokes.

The plate 13 holds the rubber ring tightly in the seat 11c of the member 11 so that relative rotation between the rubber ring and the body member does not occur. If desired, the rubber ring 12 can, in its free state, project beyond the seat 11c so that, when the plate 13 is drawn against the member 11, the ring will be deformed or "loaded" thereby preventing relative rotation between the ring and body member.

The friction grip between the member 15 and the hub of the spring plate is sufficient to transmit all torsion loads as well as to transmit all bending loads to the spokes. Obviously, of course, a welded bond or other mechanical bond between the spring plate and the member 15 could be used. Alternatively individual spokes could be used provided their inner ends were fixedly connected to the member 15, or to a similar member. The spring plate 14, however, can be easily stamped from a sheet of spring metal to provide a one-piece structure.

It will be noted from Figure 2 that the rubber ring is confined around the outer periphery and along faces thereof. The inner peripheral face of the ring is unconfined and the rubber can thus be deformed as the spokes 14a are deflected during angulation of the joint. This rubber seating for the spokes will permit deflection of the spokes without, however, permitting the feet 14c to be pulled out of the ring.

In the embodiment shown in Figures 4 and 5 the universal joint 20 can have a body or housing member 21 similar to the member 11 of the joint 10 but merely having a shallow recess 21a around the inner periphery thereof to receive a metal band 22 around a rubber ring 23. The band 22 is vulcanized to the outer periphery of the ring 23 and is held in the recess 21a by a closure plate 24 bolted to the body member 21 as by means of cap screws 25 or the like.

A spoked spring plate member 26 has spokes 26a with split outer ends bent in opposite directions to form flanges 26b as best shown in Figure 5. These flanges 26b are bonded to the inner periphery of the ring 23 as by vulcanizing or the like. Thus the flanges 26b replace the corrugated feet 14c and are seated on the inner periphery of the ring instead of in the ring. The ring 23 has unconfined faces and the ring can be deformed through interparticle flow of the rubber for permitting flexing of the spokes 26a during angulation of the joint.

From the above description it will be understood that the invention provides a simple, inexpensive universal joint which carries torque loads through spring spokes and which articulates through a flexing of the spokes made possible by a rubber mounting for the outer ends of the spokes.

It will also be understood that many forms of the invention are possible without departing from the scope of the invention.

It will, of course, be understood that various details of the invention may be varied through a wide range without departing from the principles of this invention and it is, therefore, not the purpose to limit the patent granted hereon otherwise than necessitated by the scope of the appended claims.

I claim as my invention:

1. A universal joint comprising a housing member arranged for connection to a shaft, said housing member having a ring seating recess, a rubber ring seated in said recess, means on said housing holding said rubber ring against rotation relative to the housing, a spoked spring plate having the outer ends of the spokes embedded in said rubber ring, and a shaft coupling member rigidly affixed to the central portion of said spoked plate.

2. A universal joint comprising a housing member adapted to be rotated, a resilient annulus fixedly carried by said housing member, a spring plate having a plurality of radially extending spokes, corrugated ends on said spokes embedded in said annulus, and a second member adapted to be rotated carried by the central portion of said spring plate, said housing member and said second member adapted to be articulated relative to each other and rotated at the same speed by the spoked connection therebetween.

3. A universal joint comprising a body member having a hollow hub portion adapted to be secured on a shaft, a flange portion radiating from said hub portion, and a recess in said flange portion providing an annular chamber with an open end face and an open inner peripheral side, a rubber ring in said recess, a plate secured on said flange and extending across the open face of the recess to thrust against the rubber ring for holding the ring in the recess, a flexible metal plate having a central hub portion and a plurality of spokes radiating therefrom, means securing the outer ends of said spokes to said rubber ring, and means secured to the hub portion of said plate adapted to be connected to a second shaft.

4. A universal joint comprising a housing member adapted to be rotated, a resilient annulus fixedly carried by said housing member, a second member adapted to be rotated, a plurality of spokes extending radially from said second member, oppositely outturned flange portions on the outer end of each spoke bonded to said resilient annulus, and said housing member and said second member adapted to be articulated relative to each other and rotated at the same speed by the spoked connection therebetween.

5. A universal joint comprising a housing member arranged for connection to a shaft, said housing member having a ring seating recess, a resilient annulus fixedly seated in said recess, a member having a plurality of relatively thin flat flexible spokes radiating therefrom with the flat faces thereof disposed transversely to the axis of the joint, and means anchoring the outer ends of said spokes to said resilient annulus for accommodating foreshortening of the spokes during flexing movement thereof caused by angulation of the joint.

ANTHONY VENDITTY.